United States Patent
Gong et al.

(10) Patent No.: US 10,025,438 B2
(45) Date of Patent: Jul. 17, 2018

(54) DEVICE AND METHOD FOR DETECTING DEFECTS IN SELF-CAPACITIVE TOUCH PANEL

(71) Applicants: Shenzhen China Star Optoelectronics Technology Co., Ltd., Shenzhen (CN); Wuhan China Star Optoelectronics Technology Co., Ltd., Wuhan (CN)

(72) Inventors: Qiang Gong, Shenzhen (CN); Chao Wang, Shenzhen (CN)

(73) Assignees: SHENZHEN CHINA STAR OPTOELECTRONICS TECHNOLOGY CO., LTD., Shenzhen (CN); WUHAN CHINA STAR OPTOELECTRONICS TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 14/907,967

(22) PCT Filed: Nov. 23, 2015

(86) PCT No.: PCT/CN2015/095311
§ 371 (c)(1),
(2) Date: Feb. 14, 2018

(87) PCT Pub. No.: WO2017/075850
PCT Pub. Date: May 11, 2017

(65) Prior Publication Data
US 2018/0173335 A1    Jun. 21, 2018

(30) Foreign Application Priority Data

Nov. 5, 2015   (CN) .......................... 2015 1 0746158

(51) Int. Cl.
*G06F 3/044*    (2006.01)
*G06F 3/041*    (2006.01)

(52) U.S. Cl.
CPC ............ *G06F 3/044* (2013.01); *G06F 3/0418* (2013.01); *G06F 2203/04112* (2013.01); *G09G 2310/0264* (2013.01)

(58) Field of Classification Search
CPC .................. G06F 3/044; G06F 3/0418; G06F 2203/04112; G09G 2310/0264
See application file for complete search history.

(56) References Cited

U.S. PATENT DOCUMENTS

2007/0080913 A1* 4/2007 Park .................. G09G 3/006
345/87
2011/0012823 A1* 1/2011 Tsai ................... G09G 3/3677
345/100

(Continued)

*Primary Examiner* — Christopher E Leiby
(74) *Attorney, Agent, or Firm* — Buchanan Ingersoll & Rooney, PC

(57) ABSTRACT

Disclosed is a device and a method for detecting defects in a self-capacitive touch panel. The device for detecting defects is provided with a plurality of drive circuits respectively connected to a plurality of rows of touch electrodes. The drive circuit comprises: a pre-charging unit, a synchronization unit, an output unit, and a cutoff unit. The device is capable of further detecting a short circuit defect existing between rows of touch electrodes in a touch electrode matrix.

10 Claims, 5 Drawing Sheets

(56) References Cited

U.S. PATENT DOCUMENTS

| | | | |
|---|---|---|---|
| 2014/0197845 A1* | 7/2014 | Ko | G01R 31/2829 |
| | | | 324/537 |
| 2015/0161954 A1* | 6/2015 | Tokita | G06F 3/0412 |
| | | | 345/174 |
| 2015/0185935 A1* | 7/2015 | Jang | G06F 3/044 |
| | | | 345/174 |
| 2016/0202835 A1* | 7/2016 | Mizuhashi | G02F 1/13306 |
| | | | 345/174 |
| 2016/0224177 A1* | 8/2016 | Krah | G06F 3/0416 |
| 2016/0291779 A1* | 10/2016 | Lu | G06F 3/044 |
| 2017/0010731 A1* | 1/2017 | Zhang | G11C 19/28 |
| 2017/0024077 A1* | 1/2017 | Lin | G06F 3/0416 |
| 2017/0205956 A1* | 7/2017 | Li | G06F 3/0418 |

\* cited by examiner

DEVICE AND METHOD FOR DETECTING DEFECTS IN SELF-CAPACITIVE TOUCH PANEL

CROSS-REFERENCE TO RELATED APPLICATIONS

The present application claims the priority of Chinese patent application CN 201510746158.8, entitled "Device and method for detecting defects in self-capacitive touch panel" and filed on Nov. 5, 2015, the entirety of which is incorporated herein by reference.

FIELD OF THE INVENTION

The present disclosure relates to the field of embedded touch screens, and particularly, to a device and a method for detecting defects in a self-capacitive touch panel.

BACKGROUND OF THE INVENTION

Currently, a self-capacitive touch panel, with the advantages such as a simple structure, fast response, and high sensitivity, has become more and more widely used, especially in a portable mobile device, or at an occasion having strict requirements in volume of a device. In order to further reduce the size of the touch panel, in the prior art, a common electrode layer (COM layer) located in a touch operation area is usually divided into a plurality of small blocks to form touch electrodes.

FIG. 1 schematically shows the structure of a self-capacitance touch panel of an IPS liquid crystal display device in the prior art, and FIG. 2 schematically shows a solution for detecting defects in the self-capacitive touch panel of the prior art. In FIG. 1, reference numerals 11 and 12 respectively denote touch electrodes formed by division of a common electrode layer, and signal lines for connecting the touch electrodes and detection circuits. An insulation layer 13 is disposed between the touch electrodes 11 and the signal lines 12, and each of the touch electrodes 11 is electrically connected to a corresponding signal line 12 through a via hole 14 provided in the insulation layer 13. Since it is necessary to transmit a voltage signal Vcom of the common electrode to all the touch electrodes 11 through the signal lines 12 during display, the signal lines 12 generally pass through an entire touch operation area. In the touch panel having the above-described structure, a short circuit easily occurs between the signal line 12 and other touch electrodes 11 located at a same column as the touch electrode 11 connected to the signal line 12. This prevents a detection circuit from correctly recognizing a touch position and causes display abnormality. For example, as shown in FIG. 2, a signal line 12a is used for connecting a touch electrode a11 located in a first row and at a first column of a touch electrode matrix, and passes through other touch electrodes located at the first column. A short circuit is likely to occur between the signal line 12a and other touch electrodes than the electrode a11.

FIG. 2 schematically shows a solution for detecting whether a shot-circuit defect exists between the signal line 12 and the touch electrode 11. Each odd-numbered-column signal line 12 is connected to a detection data line T1, and each even-numbered-column signal line 12 is connected to a detection data line T2. In practice, the touch electrodes 11 at odd-numbered rows of the touch electrode matrix are all connected to the detection data line T1, and the touch electrodes 11 on even-numbered rows of the touch electrode matrix are all connected to the detection data line T2. Switch elements are used to control turn-on and turn-off between the signal lines 12 and the detection data lines T1 and T2. It is possible to determine existence of a short-circuit defect based on pictures displayed by blocks corresponding to rows of touch electrodes, upon application of a detection signal to T1 and the T2, respectively. However, the above solution can be used to detect only a short circuit between all the odd-numbered rows and all the even-numbered rows, but cannot further determine a specific range in which the short-circuit defect exists.

To conclude the above, a new detection solution is in urgent need to solve the above problem.

SUMMARY OF THE INVENTION

One of the technical problems to be solved by the present disclosure is to provide a new solution, so as to determine a specific range where a short-circuit defect exists in a self-capacitive panel.

In order to solve the above technical problem, in an embodiment of the present disclosure, a device for detecting defects in a self-capacitive touch panel is first provided, which includes a plurality of drive circuits respectively connected to a plurality of rows of touch electrodes, the drive circuit comprising: a pre-charging unit, for generating a charge control signal for simultaneously presetting a first voltage for the touch electrodes; a synchronization unit, for generating a charge control signal for applying a second voltage row by row to the touch electrodes; an output unit, which outputs the first voltage and the second voltage respectively according to the charge control signals to charge the touch electrodes; and a cutoff unit, for controlling, according to a voltage of a row of touch electrodes, activation and deactivation of a charging path of a preceding row of touch electrodes.

Preferably, the drive circuit further comprises a latch unit connected to the synchronization unit to store a trigger signal for activating the drive circuits row by row.

Preferably, an input terminal of the latch unit is connected to an output terminal of the latch unit located in a preceding row.

Preferably, the cutoff unit is connected in series between the synchronization unit and the output unit, and a control signal input terminal of the cutoff unit is connected to an output terminal of the output unit located at a succeeding row.

Preferably, the cutoff unit is activated by a first voltage signal of the touch electrode, and deactivated by a second voltage signal of the touch electrode.

Preferably, the cutoff unit includes a switching element.

Preferably, a clock signal input terminal of the synchronization unit located in a row is connected to a clock signal input terminal of the latch unit located in an adjacent row.

In an embodiment of the present disclosure, a method for detecting defects in a self-capacitive touch panel is further provided, comprising the steps of: charging all pixel electrodes in an area of the self-capacitive touch panel to a third voltage; charging all touch electrodes simultaneously to a first voltage to activate charging paths thereof; and charging all the touch electrodes to a second voltage row by row, and judging whether a short circuit defect exists based on a display screen corresponding to each row of touch electrodes.

Preferably, the step of judging whether a short circuit defect exists based on a display screen corresponding to each row of touch electrodes comprises: determining, when a display screen corresponding to a block of one or more rows of touch electrodes does not display a preset picture, that a short circuit defect exists between a row of touch electrodes following the one or more rows of touch electrodes and the one or more rows of touch electrodes and/or between the row of touch electrodes following the one or more rows of touch electrodes and at least one row of touch electrodes preceding the one or more rows of touch electrodes.

Preferably, the third voltage is equal to the first voltage.

Preferably, an initial picture comprises a black screen, and a test screen comprises a white screen.

One or more embodiments of the above-described solution may have the following advantages or benefits as compared with the prior art.

The device can further detect a short circuit defects present between rows of touch electrodes in a touch electrode matrix, and the device has a simple structure and high reliability.

Other advantages, objectives, and features of the present disclosure will be set forth to a certain extent, in the description which follows and, to a certain extent, will be apparent to those skilled in the art based on observational study of the following description, or may be taught from implementation of the present disclosure. The objectives and other advantages of the present disclosure may be realized and obtained by the structure particularly pointed out in the following description, claims, and drawings.

BRIEF DESCRIPTION OF THE DRAWINGS

The drawings are provided for further understanding of the technical solution of the present disclosure or that of the prior art, and constitute one part of the description.

They serve to explain the present disclosure in conjunction with the embodiments, rather than to limit the technical solution of the present disclosure in any manner. In the drawings.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained therefrom all fall within the scope of the present disclosure.

Figure 1:
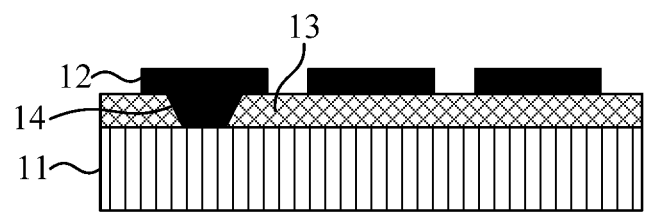
FIG. 1 schematically shows the structure of a self-capacitive touch panel of an IPS liquid crystal display device in the prior art.
Figure 2:
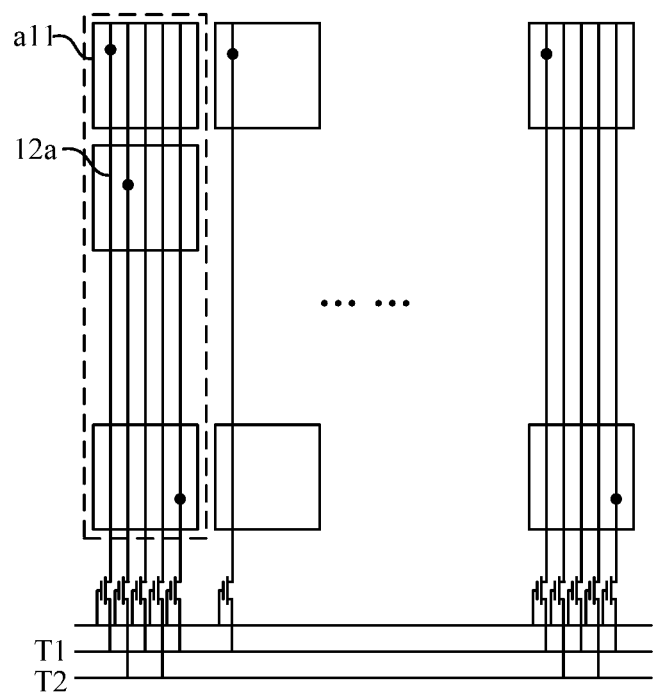
FIG. 2 schematically shows a solution for detecting defects in a self-capacitive touch panel in the prior art.
Figure 3:
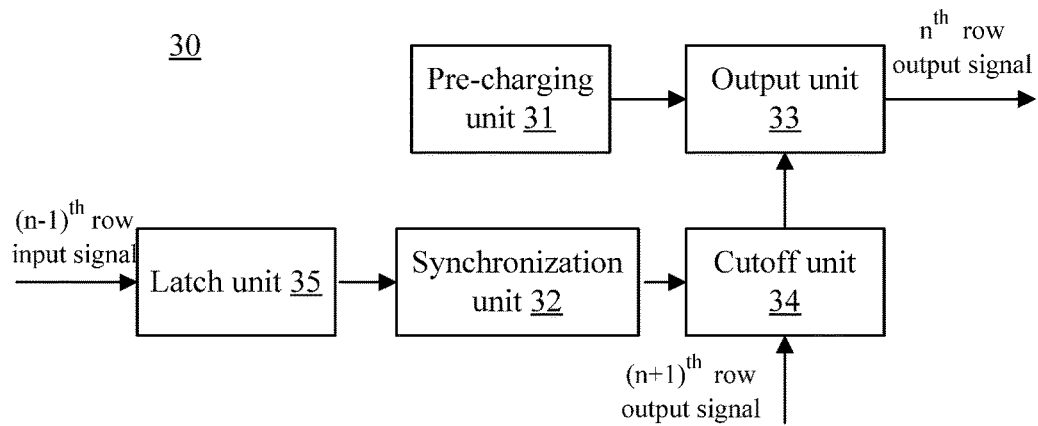
FIG. 3 schematically shows the structure of a drive circuit of a device for detecting defects in a self-capacitive touch panel according to the present disclosure.
Figure 4:
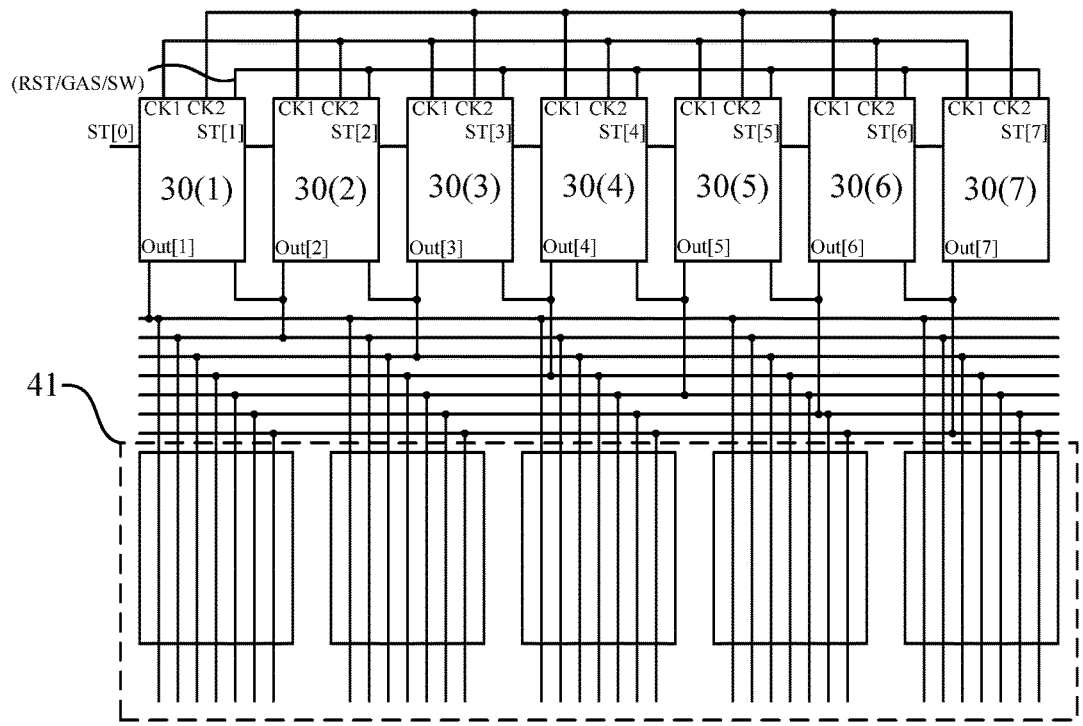
FIG. 4 schematically shows connection between a touch electrode matrix and the device for detecting defects in a self-capacitive touch panel of the present disclosure.
Figure 5:
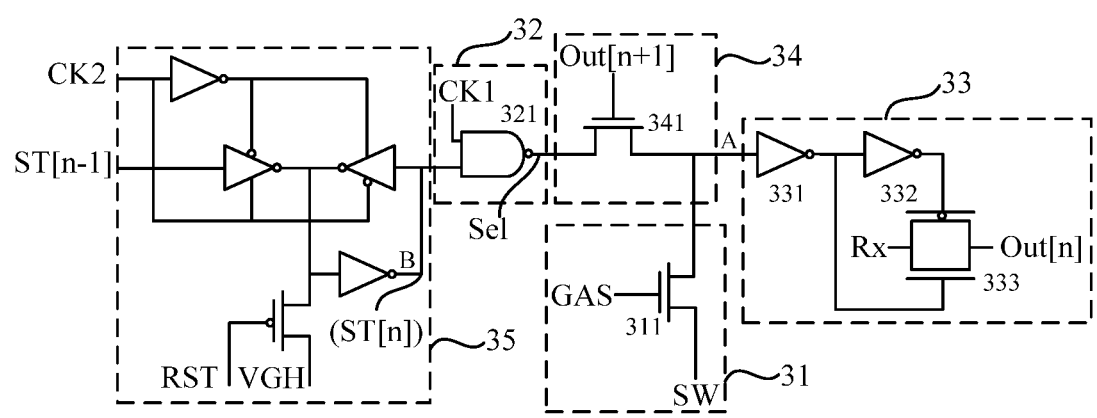
FIG. 5 schematically shows the structure of a drive circuit of the device for detecting defects in a self-capacitive touch panel according to an embodiment of the present disclosure.

FIG. 3 schematically shows the structure of a drive circuit of a device for detecting defects in a self-capacitive touch panel according to the present disclosure, and FIG. 4 schematically shows connection between a touch electrode matrix and the device for detecting defects in a self-capacitive touch panel of the present disclosure. As can be seen from FIG. 3 in combination with FIG. 4, the device for detecting defects in a self-capacitive touch panel includes a plurality of drive circuits 30, which are provided at an edge of a touch electrode matrix 41 and respectively connected to a plurality of rows of touch electrodes 11. Each of the drive circuits 30 includes a pre-charging unit 31, a synchronization unit 32, an output unit 33, a cutoff unit 34, and a latch unit 35, wherein the latch unit 35, the synchronization unit 32, and the cutoff unit 34 are successively connected in series to form a main charging control path, and the pre-charging unit 31 is connected to the output unit 33 in parallel with a series branch as described above, to form a secondary charging control path. FIG. 5 shows a specific embodiment of the present disclosure. In the embodiment as shown in FIG. 5, two control paths connected in parallel are connected together to a control signal input terminal of the output unit 33. The structure of the drive circuit 30 will be described in detail with reference to FIGS. 4 and 5 below.

The pre-charging unit 31 is used to generate a charge control signal for simultaneously presetting a first voltage for the touch electrodes 11. Specifically, as shown in FIG. 5, the pre-charging unit 31 includes a switching element 311, which has a signal input terminal connected to an SW signal, and a control terminal connected to a GAS signal. When the GAS signal is at a high level, the switching element 311 is turned on, such that the SW signal is applied to the control signal input terminal (as shown at point A in FIG. 5) of the output unit 33 through a signal output terminal of the switching element 311. When the GAS signal is at a low level, the switching element 311 is turned off, such that its branch will be in a high resistance state and will not affect other parts of the drive circuit 30. Under the effect of the charge control signal of the pre-charging unit 31, all the touch electrodes 11 of the touch electrode matrix can be charged to the first voltage at a initial time.

The synchronization unit 32 is used to generate a charge control signal for applying a second voltage to the touch electrodes 11 row by row. Specifically, as shown in FIG. 5, the synchronization unit 32 includes an NAND gate 321, which is connected, via two signal inputs thereof, to a trigger signal ST and a clock signal CK1. The trigger signal ST is used to start the drive circuit 30 which charges the touch electrodes 11 located at a corresponding row, and the clock signal CK1 is used to form a synchronized trigger signal. When the trigger signal ST is at a high level, the synchronization unit 32 outputs a low level charge control signal Sel at a rising edge of the clock signal CK1. Under the action of the control signal Sel, the touch electrodes 11 are charged row by row to the second voltage.

The output unit 33 outputs the first voltage and the second voltage, respectively, based on the charge control signals generated by the pre-charging unit 31 and the synchronization unit 32, to charge the touch electrodes 11. Specifically, as shown in FIG. 5, the output unit 33 includes two inverters 331 and 332 and a transfer gate 333. The inverters 331 and 332 are connected in series to form the control signal input terminal of the output unit 33, and the charge control signals are connected to the control signal input terminal of the output unit 33 via the point A and are connected to two control terminals of the transfer gate 333 through the inverters 331 and 332, respectively. When the charge control signal (Sel signal or SW signal) is at a low level, the transfer gate 333 is turned on, so that a signal Rx is output to the touch electrode 11 via the transfer gate 333. When the charge control signal is at a high level, the transfer gate 333 is turned off, and the voltage of the touch electrode 11 remains unchanged. Herein, the signal Rx is a voltage signal having a value of the first voltage or the second voltage.

The cutoff unit 34 is used to control activation and deactivation of a charging path. When a specific row of touch electrodes are charged to the second voltage, the cutoff unit 34 located at a preceding row will deactivate the charging path of the preceding row touch electrodes. Specifically, as shown in FIG. 5, the cutoff unit 34 includes a switching element 341, which is connected in series between the synchronization unit 32 and the output unit 33, i.e., a signal input terminal of the switching element 341 is connected to an output terminal of the synchronization unit 32, and a signal output terminal of the switching element 341 is connected to the control signal input terminal of the output unit 33. The switching element 341 supplies a transmission path for the charge control signal Sel to be transmitted to the output unit 33.

Further, a control terminal of the switching element 341 is connected to the output terminal of the output unit 33 located at a succeeding row of the switching element 341. That is, the switching element 341 located at an $n^{th}$ row is controlled by a voltage signal Out [n+1] of an $(n+1)^{th}$ row of touch electrodes 11. When the Out [n+1] is at a high level, the transmission path of the Sel signal to the output unit 33 is turned on, and the output unit 33 outputs the second voltage to charge this row of touch electrodes 11 under the action of the Sel signal. When Out [n+1] is at a low level, the transmission path of the Sel signal to the output unit 33 is turned off, such that this row of touch electrodes 11 cannot be charged and are maintained at the first voltage. Under a blocking action of the cutoff unit 34, display screens corresponding to an $(n+1)^{th}$ row of touch electrode block and an $n^{th}$ row of touch electrode block can be different, and it is thus possible to further determine a position of a short circuit defect.

The latch unit 35 includes four inverters for storing the trigger signal ST, and an output terminal of the latch unit 35 is connected to one input terminal of the synchronization unit 32. Under the action of a clock signal CK2, an effective trigger signal ST can be provided for the synchronization unit 32 of each row according to charging timing (row charging timing) of the respective row of touch electrodes 11. That is, a high-level signal is output to the synchronization unit 32 during a charging period of the $n^{th}$ row of touch electrodes, and a low-level signal is continuously output to the synchronization unit 32 during a non-charging period of the $n^{th}$ row of touch electrodes.

Specifically, as shown in FIG. 5, an input terminal of the latch unit 35 is connected to an output terminal of the latch unit located in a preceding row. That is, a trigger signal ST [n] of the output terminal of the latch unit 35 (indicated by point B in FIG. 5) of the $n^{th}$ row is used as the input signal of the latch unit 35 of the $(n+1)^{th}$ row, thereby achieving shift latch of the trigger signal. A low-level output signal of each latch unit 35 can be set in advance via an asynchronous reset terminal RST.

In the device for detecting defects of the embodiment of the present disclosure, the connecting manner of the rows of drive circuits 30 is shown in FIG. 4. Corresponding to each row of touch electrodes, one drive circuit 30 is provided. An output signal of the output unit 33 of each drive circuit 30 is fed back to a control terminal of the cutoff unit 34 of the drive circuit 30 located in a preceding row, and the output terminal of each latch unit 35 is connected to the input terminal of the latch unit 35 located at a succeeding row thereof. The clock signal CK1 (i.e., a first clock signal input terminal) of the synchronization unit 32 located in a row is connected to the clock signal CK2 (i.e., a second clock signal input terminal) of the latch unit 35 located in an adjacent row. The first clock signals clock 1 are connected to parallel terminals such as the CK1 terminal of the first row, the CK2 terminal of the second row, and the CK1 terminal of the third row, respectively, and the second clock signals clock 2 are connected to parallel terminals such as the CK2 terminal of the first row, the CK1 terminal of the second row, and the CK2 of the third row, respectively. The control terminals and the signal input terminals of the pre-charging units 31 of the drive circuits 30, and the asynchronous reset terminals of the latch units 35 of the drive circuits 30 are connected to each other, respectively.

The device for detecting defects of the embodiment of the present disclosure can realize a function of simultaneously presetting the first voltage for the touch electrodes and applying a second voltage row by row to the touch electrodes. The drive circuits can be started by an initial trigger signal ST [0] to perform detection. The charging path of a preceding row of touch electrodes is turned off when a succeeding row of touch electrodes is charged to the second voltage before the preceding row of touch electrodes due to a short circuit defect. The above procedure will be described in detail with reference to a timing chart of FIG. 6.

First, it is necessary to pre-charge the drive circuit 30, so as to activate the charging path of each row of touch electrodes. The switching element 311 is turned on by the high level of the GAS signal, during which, the SW signal is kept low, such that the transfer gate 333 is turned on, and the Rx signal is output through the transfer gate 333, to charge the touch electrodes driven by the transfer gate 333. The Rx signal is at a high level while the SW signal is being kept at the low level. This enables each row of touch electrodes to be charged to a high level as shown by Out [1], Out [2], and Out [3] in FIG. 6. Since the voltages of the touch electrodes are all high, the switching elements 341 of all rows are turned on, i.e., the charging paths of all the touch electrodes are in an activated state.

Then, the transfer gate 333 is adjusted to a stable deactivated state. This can be achieved in two steps. During activation of the switching element 311, the SW signal is turned high to close the transfer gate 333, followed by reset of the latch unit 35 by a negative pulse reset signal RST. A VGH high signal renders the output terminals of the latch units 35 low, as shown by ST [1] and ST [2] in FIG. 6. ST [1] and ST [2] are transmitted to the control signal input terminal of the output unit 33 through the synchronization unit 32 and the cutoff unit 34, to turn off the transfer gate 333. Therefore, after the GAS returns to the low level, the transfer gate 333 can still be in a stable deactivated state.

Figure 6:
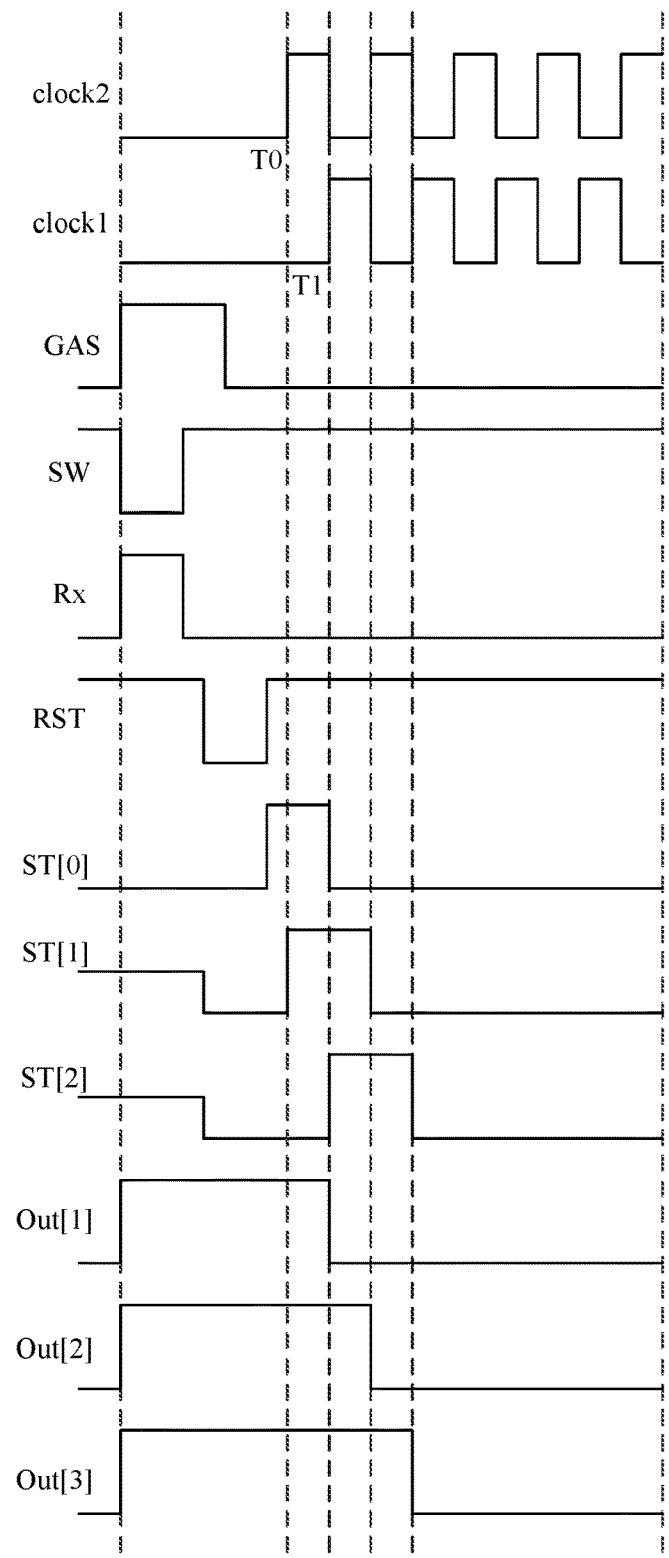
FIG. 6 is a detection timing diagram of the device for detecting defects in a self-capacitive touch panel according to the present disclosure.

Next, at time T0, the second clock signal clock 2 is applied to the input terminal of the latch unit 35 of the first row, while the initial trigger signal ST [0] is at the same time maintained at a stable high level at a rising edge of clock 2. Thus, under the action of the rising edge of clock 2, the latch unit 35 at the first row stores a positive pulse of ST [0], i.e., ST [1] goes high at the rising edge of clock 2. The ST [1] signal is applied to the input terminal of the latch unit 35 located at the second row and latched to the output terminal of the latch unit 35 located at the second row at the rising edge of the first clock signal clock 1 at time T1, i.e., ST [2] goes up to a high level. That is, under alternate actions of the first clock signal clock 1 and the second clock signal clock 2, the drive circuits obtain trigger signals ST [0], ST [1], ST [2], . . . , row by row, as shown in FIG. 6. Similarly, at the time T1, the synchronization unit 32 of the first row, under the action of the first clock signal clock 1, outputs a synchronized trigger signal Sel, which controls activation of the transfer gate 333 via an activated charging path. At such a time, the input signal Rx of the transfer gate 333 has returned to the low level, so that Out [1] is output low. Further, the synchronization unit 32 of the second row, under the action of the second clock signal clock 2, outputs a synchronized trigger signal Sel and controls Out [2] to be output low, so on and so forth. Signals Out [1], Out [2], Out [3], etc. are output by the touch electrodes row by row. That is, the touch electrodes are charged to the second voltage row by row, as shown in FIG. 6.

It can be seen from the above working procedure, that with the device for detecting defects, a complicated scanning mode is unnecessary. Instead, it only requires a corresponding initial setting to perform defect detection on the touch electrodes, under the action of the initial trigger signal ST [0] and the clock signal. A test signal is simple and easy to implement, and more reliable.

Figure 7:
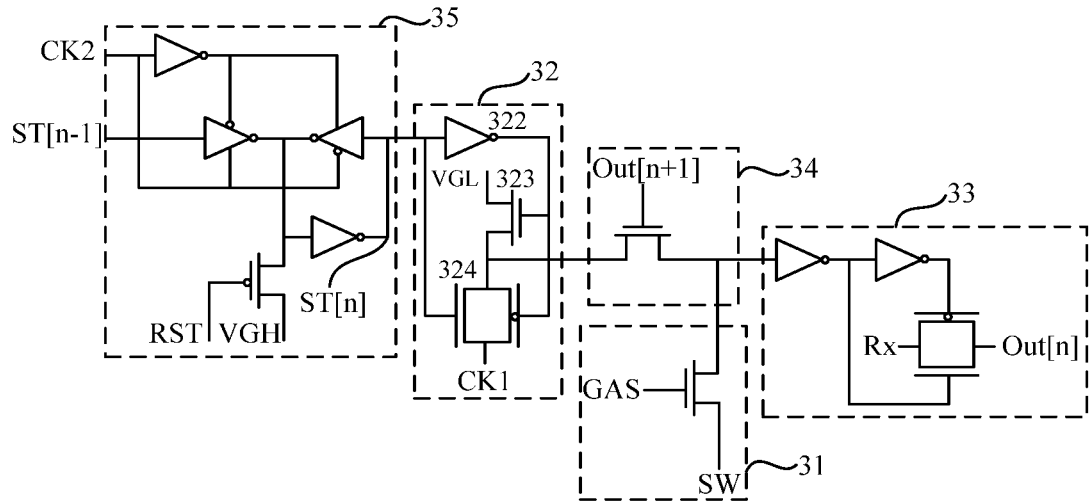
FIG. 7 schematically shows the structure of a drive circuit of the device for detecting defects in a self-capacitive touch panel according to another embodiment of the present disclosure.

It is to be noted that the structure of the drive circuit of the device for detecting defects according to the present disclosure may also be in other forms. In another embodiment of the present disclosure as shown in FIG. 7, the synchronization unit 32 comprises an inverter 322, a switching element 323, and a transfer gate 324. When the trigger signal input into the synchronization unit 32 is at a high level, the transfer gate 324 is turned on, and the switching element 323 is turned off, so that the clock signal CK1 is output via the transfer gate 324. When the trigger signal input into the synchronization unit 32 is at a low level, the switching element 323 is turned on, and the transfer gate 324 is turned off, so that a low level VGL is output via the switching element 323. In addition, it is to be understood that polarities of the respective signals in the above-described embodiments may be used interchangeably to implement the present disclosure. This will not be described herein.

Figure 8:
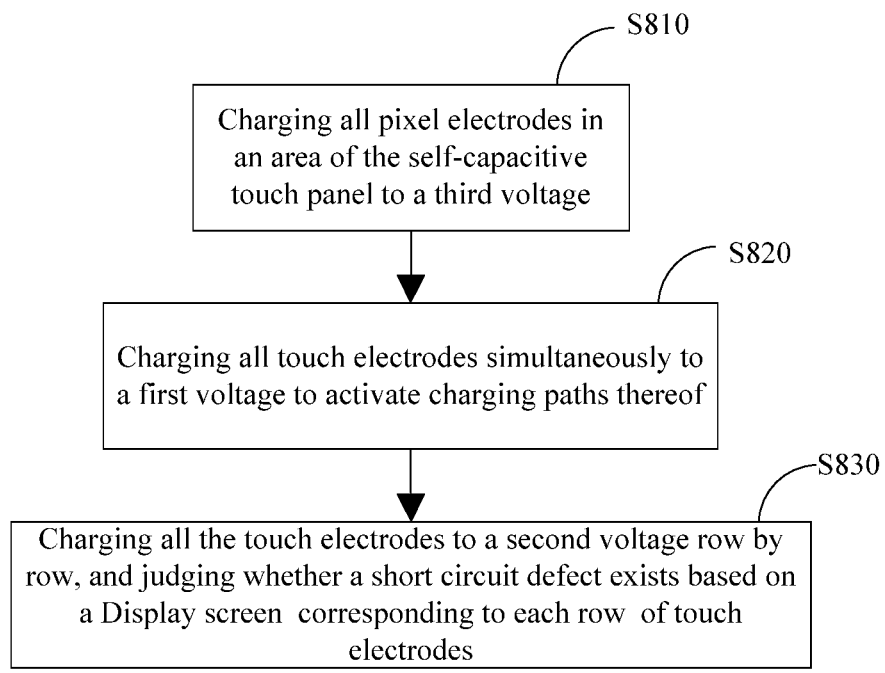
FIG. 8 is a flow chart showing a method for detecting defects in a self-capacitive touch panel according to the present disclosure.

A method for detecting defects with the device for detecting detects in a self-capacitive touch panel is shown in FIG. 8, comprising the following steps.

In step S810, each pixel electrode in an area of the self-capacitive touch panel is charged to a third voltage. In step S820, the touch electrodes are simultaneously charged to the first voltage to turn on the charging paths of all the touch electrodes. In step S830, the touch electrodes are charged to the second voltage row by row, and it is judged whether there is a short circuit defect based on a display screen corresponding to a touch electrode block of each row. The following description will be made with reference to FIG. 3.

First, all data lines in a self-capacitive touch operation region are used to charge the pixel electrodes in the region to the third voltage, for example, 4.5 V. Afterwards, each of the touch electrodes is charged to the first voltage. The first voltage may be equal to the third voltage, i.e., the first voltage is also 4.5 V. A pixel electrode can be charged by a drive circuit of a liquid crystal display panel, while the touch electrode can be charged in pre-charging timing of the device for detecting defects described above. When the pixel electrode and the touch electrode have a same voltage, an initial screen in an IPS LCD device corresponding to the touch electrode block of a row is displayed in black. Further, under the action of the first voltage signal, the charging paths of the rows of touch electrodes are all turned on.

Next, a second voltage, for example 0 V, is applied to the touch electrodes row by row. The pixel electrodes are maintained at the third voltage before being charged. The above charging step can be completed by the device for detecting defects in detection timing performed after the time T0. Since the charging paths of all rows are in an activated state, the rows of touch electrodes can be charged to 0 V in turn, and the screen displayed by the corresponding blocks will be changed from black to white. If there is a short circuit defect between the touch electrode and the signal line located in a different row, a position of the defect can be determined according to the change of the display screen.

Specifically, when a screen corresponding to a block of one or more rows of touch electrodes does not display a preset picture, it is determined that a short circuit defect exists between a row of touch electrodes following the one or more rows of touch electrodes and the one or more rows of touch electrodes and/or between the row of touch electrodes following the one or more rows of touch electrodes and at least one row of touch electrodes preceding the one or more rows of touch electrodes. For example, it can be assumed that a signal line of the first row of touch electrodes is short-circuited with the fourth row of touch electrodes, the fourth row of touch electrodes would then be charged at the same time when the first row of the touch electrodes is being charged. When the fourth row of touch electrodes is charged to be 0 V, the charging path of the third row of touch electrodes will be turned off, so that the third row of touch electrodes cannot be charged to a specified voltage of 0 V. The screen corresponding to the touch electrode block of the third row remains black. Thus, depending on the display of the screen, it is possible to determine that there may be a short circuit between the fourth row and one or more of the first, second, and third row of touch electrodes (or signal lines of the touch electrodes).

Another example is when the short circuit defect exists between the third row of touch electrodes and the fourth row of touch electrodes, the third row of touch electrode swill start to be charged at the same time as the fourth row of touch electrodes. When the voltage of the fourth row of touch electrodes is increased to a specific value, the charging path of the third row of touch electrodes is turned off by the cutoff unit 34 of the third row. At this time, the third row of touch electrodes has not been charged to the preset second voltage, such that the block corresponding to the third row of touch electrodes will show a gray screen between the white screen and black screen. It can thus be determined that a defect exists between the two adjacent rows.

It is to be noted that, after a range is determined for the above-mentioned defect, a specific row or specific rows of touch electrodes (or between the signal line of the touch electrodes and the touch electrodes) where the short circuit exists can be to be further detected within the range as determined, so as to eliminate the defect.

It is also to be noted that, in the above embodiment, the first voltage and the third voltage are set to be 4.5 V and the second voltage is set to be 0 V for the sake of convenient operation. This can lead to more distinct differences in images, which is favorable for observation. Of course, the first voltage, the second voltage, and the third voltage may be set to be other values, as long as it is possible to control the activation and deactivation of the charging path by the values of the first voltage and the second voltage. The first voltage and the third voltage may also be set to be different values, which can also be used to implement the present disclosure.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. Hence, the scope of the present disclosure should be subject to the scope defined in the claims.

The invention claimed is:

1. A device for detecting defects in a self-capacitive touch panel, which is provided with a plurality of drive circuits respectively connected to a plurality of rows of touch electrodes, the drive circuit comprising:
   a pre-charging unit, for generating a charge control signal for simultaneously presetting a first voltage for the touch electrodes;
   a synchronization unit, for generating a charge control signal for applying a second voltage row by row to the touch electrodes;
   an output unit, which outputs the first voltage and the second voltage respectively according to the charge control signals to charge the touch electrodes; and
   a cutoff unit, for controlling, according to a voltage of a row of touch electrodes, activation and deactivation of a charging path of a preceding row of touch electrodes.

2. The device for detecting defects according to claim 1, wherein the drive circuit further comprises:
   a latch unit connected to the synchronization unit to store a trigger signal for activating the drive circuits row by row.

3. The device for detecting defects according to claim 2, wherein an input terminal of the latch unit is connected to an output terminal of the latch unit located in a preceding row.

4. The device for detecting defects according to claim 3, wherein the cutoff unit is connected in series between the synchronization unit and the output unit, and a control signal input terminal of the cutoff unit is connected to an output terminal of the output unit located at a succeeding row.

5. The device for detecting defects according to claim 4, wherein the cutoff unit is activated by a first voltage signal of the touch electrode, and deactivated by a second voltage signal of the touch electrode.

6. The device for detecting defects according to claim 5, wherein the cutoff unit includes a switching element.

7. The device for detecting defects according to claim 3, wherein a clock signal input terminal of the synchronization unit located in a row is connected to a clock signal input terminal of the latch unit located in an adjacent row.

8. A method for detecting defects in a self-capacitive touch panel, comprising the steps of:
   charging all pixel electrodes in an area of the self-capacitive touch panel to a third voltage;
   charging all touch electrodes simultaneously to a first voltage to activate charging paths thereof; and
   charging all the touch electrodes to a second voltage row by row, and judging whether a short circuit defect exists based on a display screen corresponding to each row of touch electrodes.

9. The method for detecting defects according to claim 8, wherein the step of judging whether a short circuit defect exists based on a display screen corresponding to each row of touch electrodes comprises:
   determining, when a display screen corresponding to a block of one or more rows of touch electrodes does not display a preset picture, that a short circuit defect exists between a row of touch electrodes following the one or more rows of touch electrodes and the one or more rows of touch electrodes and/or between the row of touch electrodes following the one or more rows of touch electrodes and at least one row of touch electrodes preceding the one or more rows of touch electrodes.

10. The method for detecting defects according to claim 8, wherein the third voltage is equal to the first voltage.

* * * * *